(12) United States Patent
Asente

(10) Patent No.: US 10,152,809 B2
(45) Date of Patent: Dec. 11, 2018

(54) CONTOUR GRADIENTS USING THREE-DIMENSIONAL MODELS

(71) Applicant: Adobe Systems Incorporated, San Jose, CA (US)

(72) Inventor: Paul John Asente, Redwood City, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/389,871

(22) Filed: Dec. 23, 2016

(65) Prior Publication Data

US 2017/0109906 A1   Apr. 20, 2017

Related U.S. Application Data

(63) Continuation of application No. 14/012,714, filed on Aug. 28, 2013, now Pat. No. 9,558,571.

(51) Int. Cl.
| | |
|---|---|
| *G06T 11/00* | (2006.01) |
| *G06T 11/20* | (2006.01) |
| *G06T 15/10* | (2011.01) |
| *G06T 19/00* | (2011.01) |

(52) U.S. Cl.
CPC ............ *G06T 11/203* (2013.01); *G06T 15/10* (2013.01); *G06T 19/00* (2013.01)

(58) Field of Classification Search
None
See application file for complete search history.

(56) References Cited

U.S. PATENT DOCUMENTS

| | | |
|---|---|---|
| 6,867,787 B1 | 3/2005 | Shimizu et al. |
| 2010/0208981 A1 | 8/2010 | Minear et al. |
| 2012/0190984 A1 | 7/2012 | Kim et al. |

OTHER PUBLICATIONS

Shaver, "Warped 3D Text Using Photoshop Repousse and Zbrush," Jun. 2012, retrieved from http://www.designpanoply.com/blog/warped-3d-text-using-photoshop-repousse-and-zbrush on Feb. 9, 2018.*
"Bevel Effect Explained," Feb. 2011, retrieved from http://www.rw-designer.com/bevel-effect-explained on Apr. 22, 2015.
"Beginners Guide to 30 Text," Jun. 2012, retrieved from http://www3.turbocadcommunity.com/tiki- index.php? page=Beginners%20guide%20to%203D%20text&pagenum=5 on Apr. 23, 2015.

* cited by examiner

*Primary Examiner* — Ryan D McCulley
(74) *Attorney, Agent, or Firm* — Shook, Hardy & Bacon, L.L.P.

(57) ABSTRACT

A method and systems of applying a contour gradient to a two-dimensional path are provided. A three-dimensional polygonal shell may be constructed from the two-dimensional path. Then the three-dimensional polygonal shell may be projected into two dimensions, resulting in a two-dimensional projected model, while saving values for a third dimension for each point in the two-dimensional projected model. Then a range of all values for the third dimension in the two-dimensional projected model is determined from the saved values. The range can then be mapped to a visual attribute. The two-dimensional projected model may be displayed using the mapped visual attribute.

20 Claims, 9 Drawing Sheets

CONTOUR GRADIENTS USING THREE-DIMENSIONAL MODELS

CROSS REFERENCE TO RELATED APPLICATIONS

This application is a continuation of and claims priority to, U.S. patent application Ser. No. 14/012,714, filed on Aug. 28, 2013, entitled CONTOUR GRADIENTS USING THREE-DIMENSIONAL MODELS, the entirety of which is incorporated herein by reference.

FIELD

The present disclosure relates generally to computer graphics. More specifically, the present disclosure relates to contour gradients using three-dimensional models.

BACKGROUND

In computer graphics, a gradient is a directional change in a feature of an image. A color gradient, for example, is a portion of an image where color gradually changes in a particular direction. Basic gradients have color contours that follow simple paths, such as straight lines or ellipses. Most rendering systems support simple gradients, which allows authoring programs to create them in a resolution-independent way. This allows the final renderer to use the device attributes and output size to assign colors in a way that will avoid banding artifacts, creating a "custom" gradient tailored to the device attributes and output size.

Contour gradients, sometimes called shape gradients, are another type of gradient. Because of their complexity, they are not directly supported by rendering systems. Instead, applications that support them represent them using combinations of simpler constructs, such as raster images or multiple inset copies of a path. Neither of these solutions, however, is resolution or scale independent. Instead, resolution and contour spacing is determined by the authoring program when an illustration is saved. If the results are later scaled up, pixels or contours can become evident.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a three dimensional bevel or other projection of a path may be intersected with a horizontal plane in order to construct an inset copy of a path. If each face of a three dimensional model is colored with a linear gradient so that the gradient contours are horizontal, the result can be projected down to the plane of a path to give a contour gradient. Gradients need not actually be applied to the bevel faces. Instead, the faces can be projected into two dimensions and then each filled with a linear gradient. It should be noted that while a horizontal or x-y plane is described as being projected upon, it is possible to perform the projection onto any two dimensional plane.

First, the input path may be divided into a plurality of polygons. If the input path contains curved segments, these curved segments can be approximated with a series of line segments, so that the resulting polyline lies within some small tolerance t of the original path. To avoid visible corners if the result is greatly enlarged, the flattened path can be offset by t, creating a path that completely encloses the original path. Gradient-filled faces can then be clipped with a copy of the original path to create a smooth curved border.

When a linear gradient is used to fill a path, its appearance can be controlled by its gradient vector. The start of the gradient vector is assigned the starting color of the gradient, while the end of the gradient vector is assigned the ending color of the gradient. The color contours then extend perpendicularly to the gradient vector. The resulting gradient can then be clipped by the path being filled.

Figure 1:
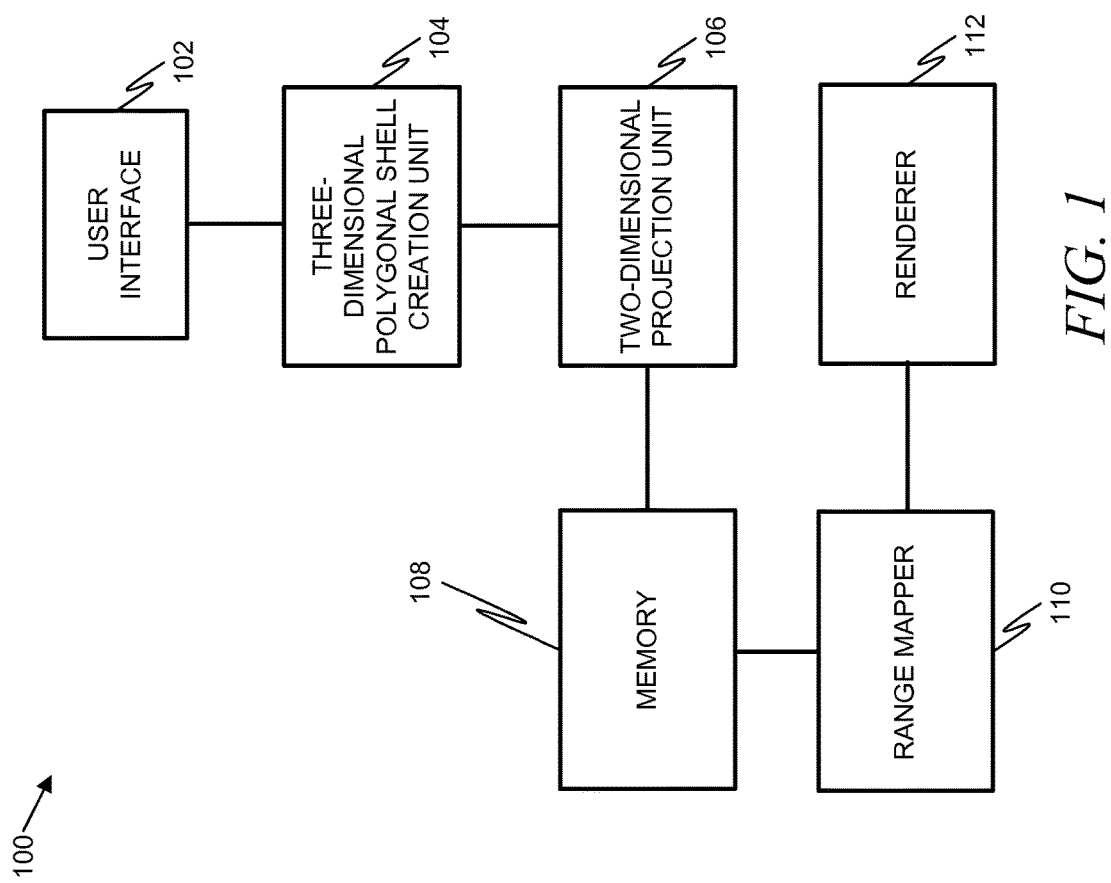
FIG. 1 is a diagram illustrating a system 100, in accordance with an example embodiment of creating gradients using three dimensional models.

FIG. 1 is a diagram illustrating a system 100, in accordance with an example embodiment of creating gradients using three dimensional models. The system 100 may be implemented on any number of different hardware components. In an example embodiment, the system 100 is implemented on a computer system executed by a processor. In another example embodiment, the system 100 may be executed using a graphics processing unit (GPU).

In some embodiments, the system 100 may reside on a user machine, such as a personal computer (PC), tablet computer, smartphone, and the like. In other embodiments, the system 100 may reside on a centralized server in communication with a user machine. In such embodiments, the user machine may direct the centralized server to perform the creation of the gradients. It should be noted that hybrid embodiments are also envisioned, where some aspects of the gradient creation are performed on a user machine and others are performed on a centralized server. This allows a user machine to offload part or all of the gradient creation to another machine for faster processing.

The system 100 may include a user interface 102 which may act to collect two-dimensional path information. A three-dimensional polygonal shell creation unit 104 may then create a three-dimensional polygonal shell from the two-dimensional path information. A two-dimensional projection unit 106 may then project the three-dimensional polygonal shell into two dimensions, while storing values for the third dimension in memory 108. A range mapper 110 may then map the range of three dimensional values from the memory 108 onto a visual attribute. A renderer 112 may then render the two-dimensional path using the mapped visual attribute.

Figure 2:
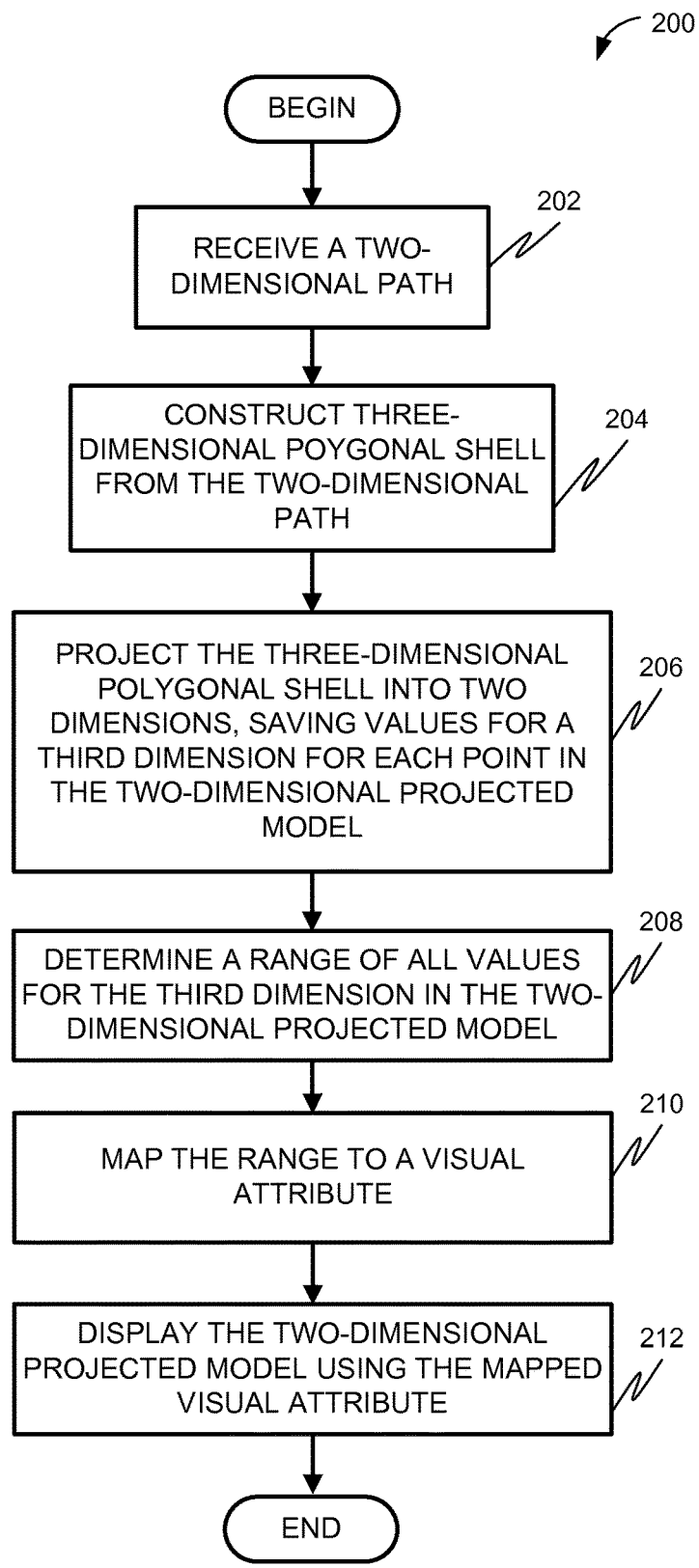
FIG. 2 is flow diagram illustrating a method 200, in accordance with an example embodiment, of applying a contour gradient to a two-dimensional path.
Figure 3A:
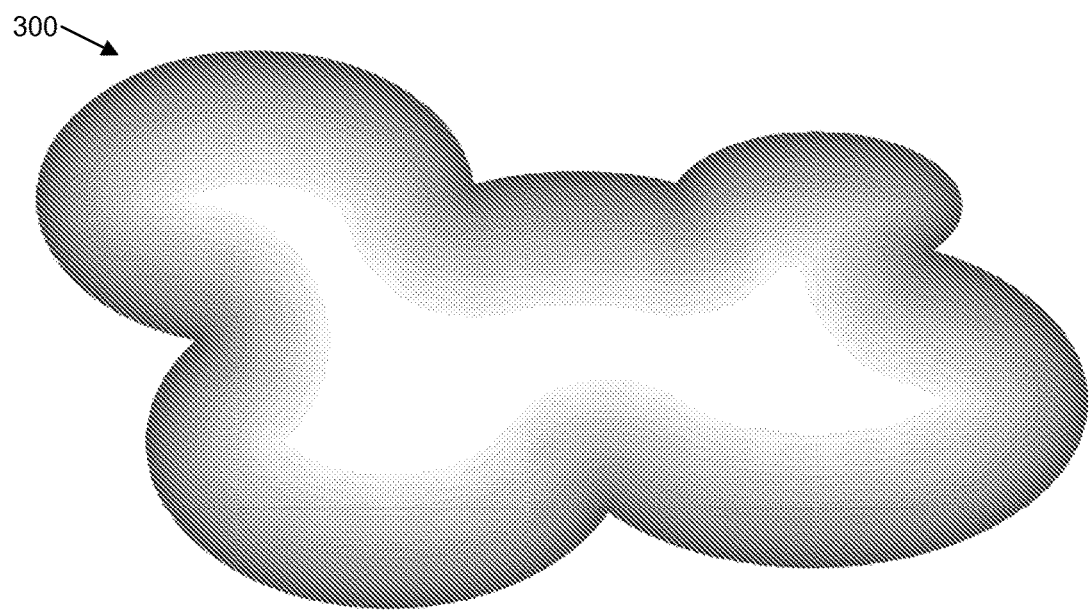
FIG. 3A is a diagram illustrating an example, in accordance with an example embodiment, of a two-dimensional path that has been filled with a contour gradient.

FIG. 2 is flow diagram illustrating a method 200, in accordance with an example embodiment, of applying a contour gradient to a two-dimensional path. At operation 202, a two-dimensional path is received. This path may be any shape, such as a rectangle, ellipse, character outline, etc. The path may or may not have holes. This path may be received from a user, or may be received from a software or hardware component (or memory). FIG. 3A is a diagram illustrating an example, in accordance with an example embodiment, of a two-dimensional path 300 that has been filled with a contour gradient.

Figure 4A:
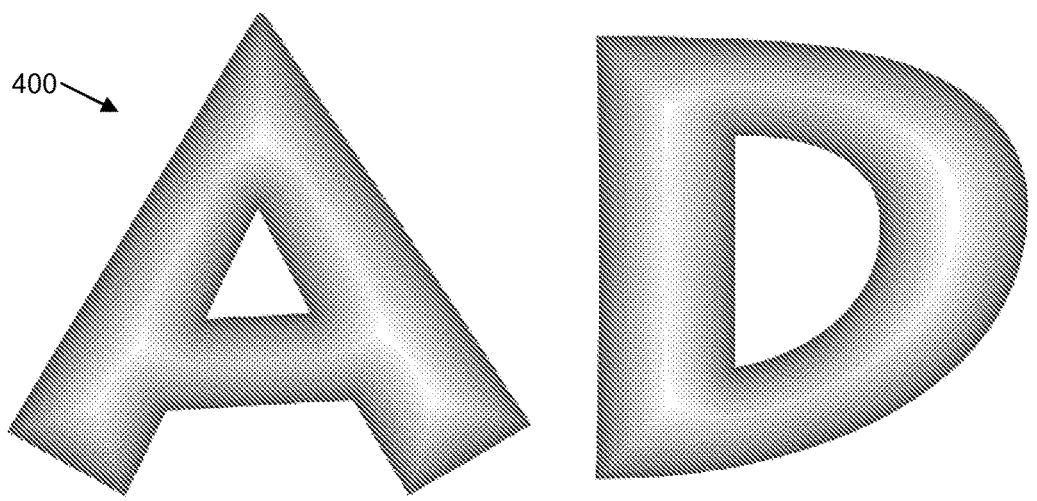
FIG. 4A is a diagram illustrating another example, in accordance with an example embodiment, of a two-dimensional path that has been filled with a contour gradient.

The two-dimensional path 300 includes a contour based on shade (as can be seen, the two-dimensional path 300 has darker shades near the edges and lighter near the center). FIG. 4A is a diagram illustrating another example, in accordance with an example embodiment, of a two-dimensional path 400 that has been filled with a contour gradient. This two-dimensional path 400 also has a contour based on shade.

Figure 3B:
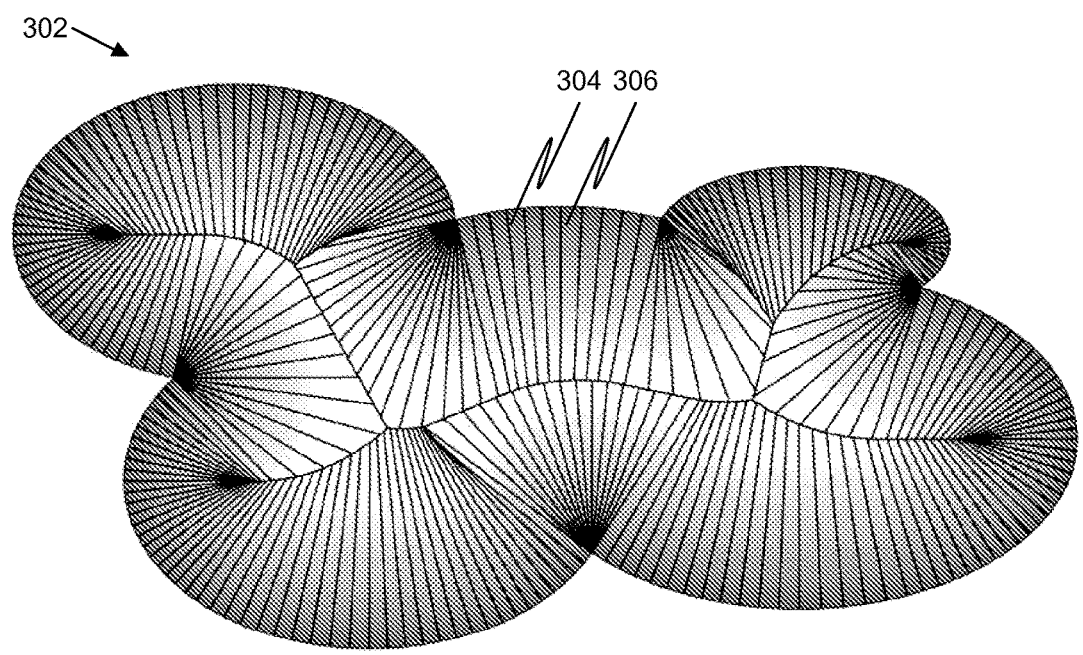
FIG. 3B is a diagram illustrating an example, in accordance with an example embodiment, of how a contour gradient can be represented as a three-dimensional polygonal shell projected into two dimensions.
Figure 4B:
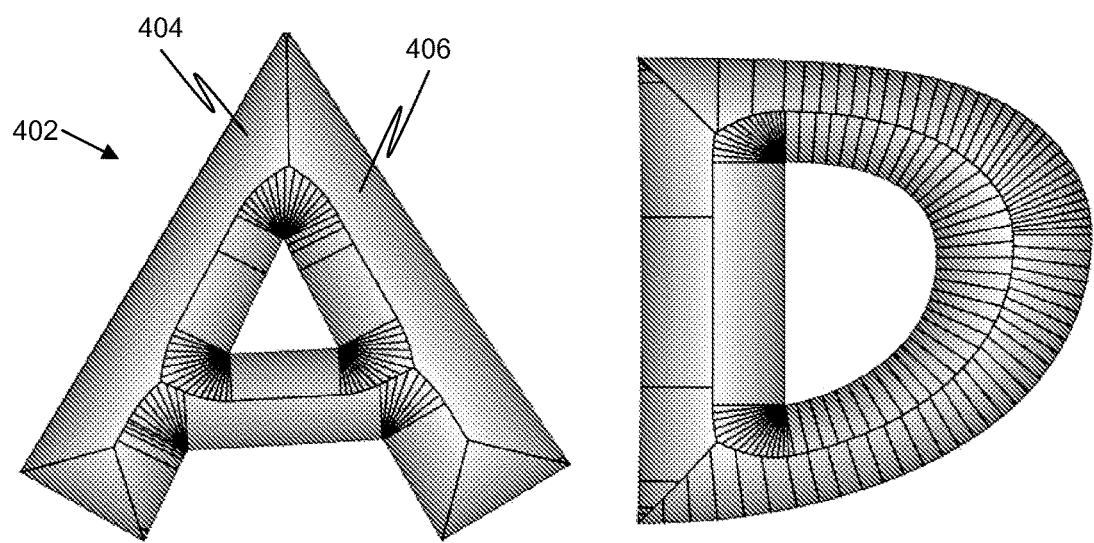
FIG. 4B is a diagram illustrating another example, in accordance with an example embodiment, of how a contour gradient can be represented as a three-dimensional polygonal shell projected into two dimensions.

At operation 204, a three-dimensional polygonal shell is constructed from the two-dimensional path. In an example embodiment, the two-dimensional path is placed on an XY plane and beveled inwards at a preset angle (such as 45 degrees). In other embodiments, other types of mechanisms, such as any mechanism that "puffs up" the two-dimensional path into three dimensions, may be used, such as wrapping the two-dimensional path around a half-cylinder with the cut side on the XY plane. FIG. 3B is a diagram illustrating an example, in accordance with an example embodiment, of how a contour gradient can be represented as a three-dimensional polygonal shell 302 projected into two dimensions. The three-dimensional polygonal shell 302 includes a number of polygons (e.g., polygons 304, 306) created using the above technique. FIG. 4B is a diagram illustrating another example, in accordance with an example embodiment, of how a contour gradient can be represented as a three-dimensional polygonal shell 402 projected into two dimensions. This three-dimensional polygonal shell 402 also has a number of polygons (e.g., polygons 404, 406).

Additionally, there are a number of different ways to vary the bevel, creating variations of the contour gradient. One variation is to truncate the bevel at some maximum height, so that it stops with an inset, horizontal version of the original path. However, this can also be achieved by modifying the gradient so that its ending section is a solid color. For example, if the gradient is black at its beginning and white at its end, one can achieve the effect of truncating the bevel at half its original height by adjusting the gradient so that it is black at the beginning, gray in the center, and also gray at the end.

One could also vary the bevel profile rather than using a 45 degree angle. For example, if one used a quarter circle for a bevel profile, the bevel would be very steep near the path edges and flatter in the interior, leading to a contour gradient that changes most quickly near the path and more slowly in the interior. But again, one could achieve the same effect by modifying the gradient, letting its color vary non-linearly. Modifying the gradient has the additional benefit of avoiding the large number of faces that a curved bevel profile would create.

Another possible variation is to perform a horizontal skew operation on the bevel before projecting it into two dimensions. This leads to a non-centered contour gradient with its color contours shifted in one direction. The most pleasing effects may occur when the skew is limited to avoid letting the bevel fold over upon itself, leading to faces that point downward. However, by not converting these downward-facing faces, the result can still be reasonable.

At operation 206, the three-dimensional polygonal shell is projected into two dimensions. In an example embodiment, this may be performed by projecting the shell directly down onto the XY plane (e.g., projecting the point (x0, y0, z0) to the point (x0, y0, 0)). However, in other example embodiments, the shell can be projected onto any plane. This results in a two-dimensional projected model. During this projection process, the value of the third dimension (z) is saved for each projected point. For example, the point (102, 114, 202) may be projected to (102, 114, 0) while (202) is saved as the third dimension value for this projected two-dimensional point. This saved third dimension value may be referred to as t.

At operation 208, the range of all t's, defined as [Tmin, Tmax] in the two-dimensional projected model, is determined.

At operation 210, the range [Tmin, Tmax] is mapped onto some visual attribute, such as color or opacity. The visual attribute may be any type of visual attribute, and additional examples include, but are not limited to, brightness and contrast. This mapping can be linear or nonlinear. For example, for some value t between Tmin and Tmax, a linear opacity mapping would be opacity(t)=(t−Tmin)/(Tmax−Tmin). Alternatively, a quadratic opacity can be computed as opacity(t)=((t−Tmin)/(Tmax−Tmin))2, which would have the effect of making the opacity change less quickly near the minimum value, and more quickly near the maximum value.

In another example embodiment, a color gradient can be defined to be a function from the input range [0, 1] onto color values. For example, one could define a color gradient as C(0)=black, C(0.25)=white, C(1)=black, C(t between 0 and 0.25)=a color smoothly varying between black and white, C(t between 0.25 and 1)=a color smoothly varying between white and black.

In another example embodiment, the range [Tmin, Tmax] may be mapped onto a color gradient. For example, using the above-defined color gradient C, a mapping can map the range [Tmin, Tmax] onto a value between 0 and 1:

$$value(t)=(t-Tmin)/(Tmax-Tmin)$$

then this value can be mapped through the gradient to get a final color:

$$color(t)=C(value(t))$$

At operation 212, the two-dimensional projected model can be displayed using the mapped visual attribute from operation 210.

Figure 5A:
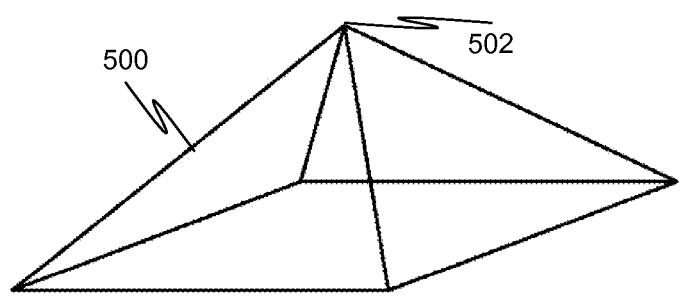
FIGS. 5A-5C are diagrams illustrating an example execution of the method described in FIG. 2 and the corresponding text.
Figure 5B:
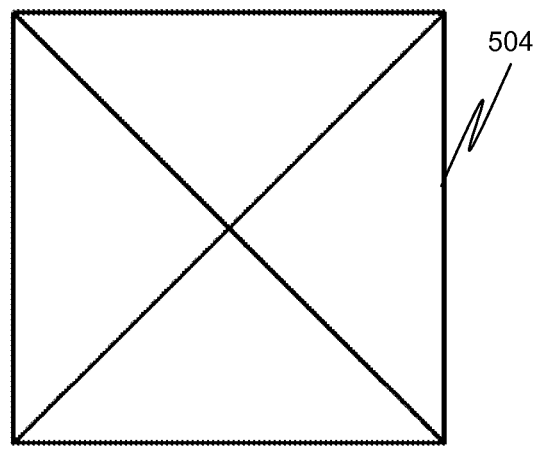
Figure 5C:
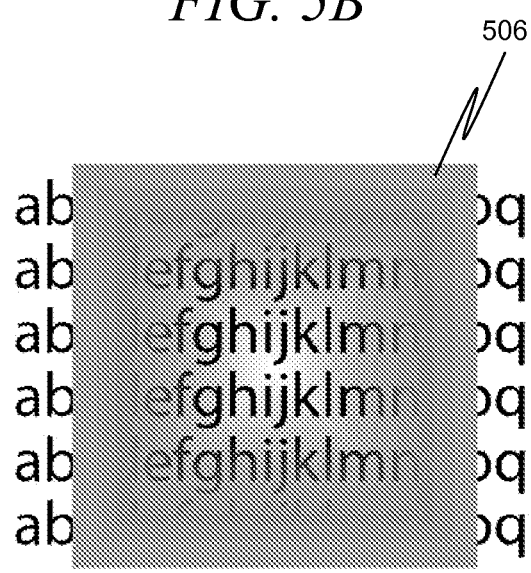

FIGS. 5A-5C are diagrams illustrating an example execution of the method described in FIG. 2 and the corresponding text. Referring first to FIG. 5A, if the two-dimensional path is a square, then a beveling of the square at a 45 degree angle results in a three-dimensional polygonal shell that resembles a pyramid 500. If the square has sides of length 10, then the pyramid has its peak at the point (5, 5, 5) 502. Then this pyramid is projected down onto the XY plane, resulting in the two-dimensional projected model 504 in FIG. 5B. The range in the projection direction is [0, 5]. The function T(p) is the height of the pyramid above the point p. If the range [0, 5] is mapped onto opacity, with 0 being fully opaque and 5 being fully transparent, then the resulting shape is the square 506 in FIG. 5C, which has a range of opacity (the letters behind the square 506 are used to show the varying levels of opacity of the square 506). The square 506 is fully opaque along its edges, fading to fully transparent in the very middle. Further, this function may be applied in a resolution-independent manner, thus avoiding the visual artifacts of prior art solutions.

Figure 6A:
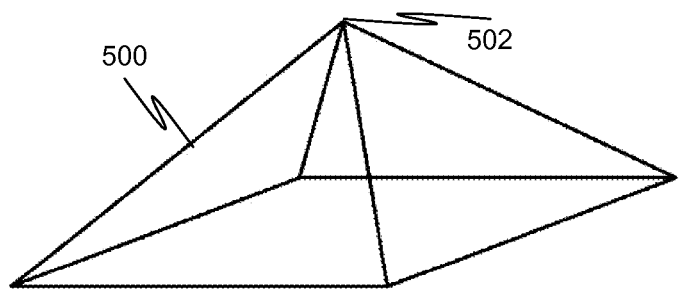
FIGS. 6A-6C are diagrams illustrating another example execution of the method described in FIG. 2 and the corresponding text.
Figure 6B:
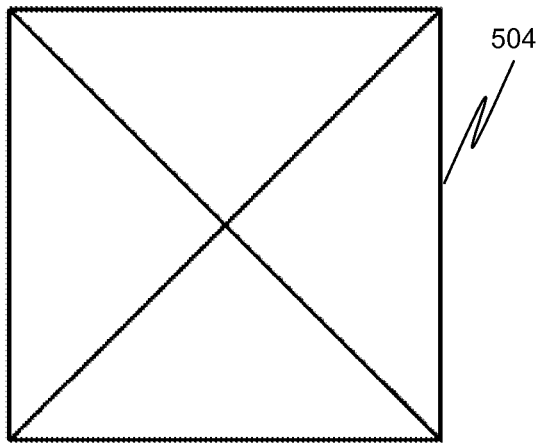
Figure 6C:
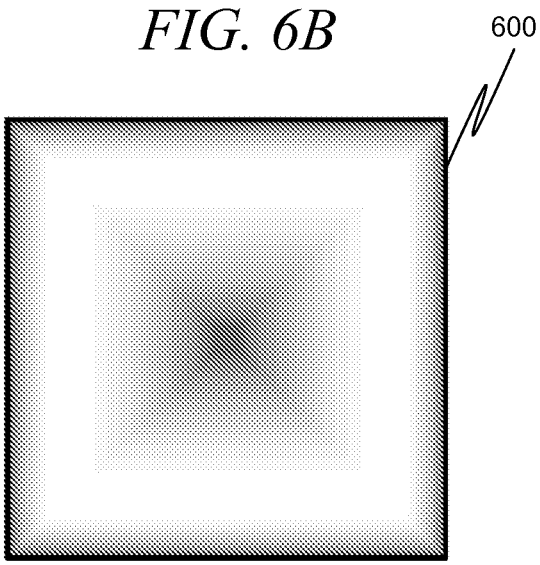

FIGS. 6A-6C are diagrams illustrating another example execution of the method described in FIG. 2 and the corresponding text. This execution is identical to that presented above with respect to FIGS. 5A-5C, except that instead of opacity, the range [0, 5] is mapped onto colors (here, white to gray). Thus, FIG. 6C depicts a square 600 with a range of colors from white to gray. Here, the color gradient can be defined to be a function from the input range [0, 1] onto color values. For example, one could define a color gradient as C(0)=gray, C(0.25)=white, C(1)=gray, C(t between 0 and 0.25)=a color smoothly varying between gray and white, C(t between 0.25 and 1)=a color smoothly varying between white and gray. This is what is commonly called a "contour gradient" or "shape gradient".

In a more specific example embodiment, a color gradient G is used to color the entire xy plane so that the gradient extends from one point to another. Specifically, if the color at a first point is G(0) and the color at a second point is G(1), then for a point P on the segment connecting the first point (P0) and the second point (P1), $t=\|P-P0\|/\|P1-P0\|$. For a point P not on the segment connecting P0 and P1, P may be projected perpendicularly onto the line connecting P0 and P1, giving a point Pp. If point Pp is between P0 and P1, then the color at P is the color at Pp. If Pp is not between P0 and P1, the color at P is the color at P0 if Pp is closer to P0 than to P1, and the color at P1 if Pp if closer to P1 than to P0. Then a path can be displayed by showing the portion of this colored plane that is within the path. This is known as filling the path with the gradient, using the vector from P0 to P1 as the gradient vector.

Figure 7:
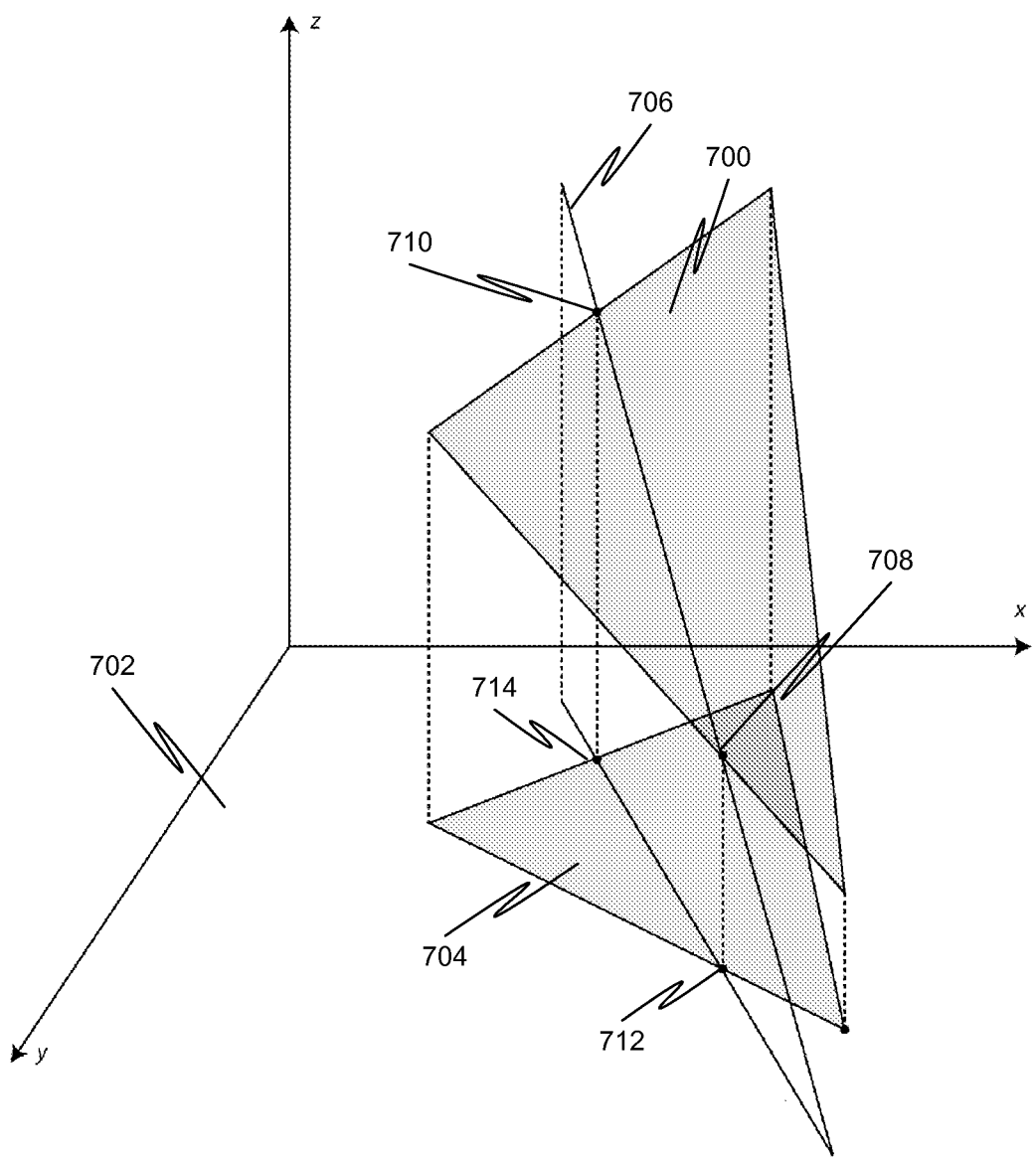
FIG. 7 is a diagram illustrating a method, in accordance with another specific example embodiment, of projecting a face of a three-dimensional polygonal into two dimensions.

FIG. 7 is a diagram illustrating a method, in accordance with another specific example embodiment, of projecting a face of a three-dimensional polygonal into two dimensions. First the range [Zmin, Zmax] of Z coordinates in the model are found. The function F(t)=(t−Zmin)/(Zmax−Zmin) is then defined, which linearly maps the range [Zmin, Zmax] to the range [0,1]. Then, for each face F 700 in the model, the following process may be performed. First F 700 is projected onto the XY plane 702 by setting the Z coordinate of each of its vertices to 0. Call this projected face Fp 704. Then let N be the normal to F. If N points either straight up, or straight down, then the face F 700 is horizontal. In that case, let t be the z coordinate of any vertex of F 700 and make Fp the solid color G(F(t)), and skip the rest of the steps. If N does not point either straight up or straight down, then construct a line L 706 in space that lies upon the face F 700 and extends in the direction of the most rapid Z change. This line is perpendicular to N. Let Pmin be the point 708 where L intersects the horizontal plane at z=Zmin, and Pmax be the point 710 where L intersects the horizontal plane at z=Zmax. Then project Pmin onto the XY plane by setting its Z coordinate to 0 and call the result P0 712. Then project Pmax onto the XY plane by setting its Z coordinate to 0, and call the result P1 714. Then display the projected face Fp 704 using gradient G, using the vector from P0 to P1 as the gradient vector.

Figure 8A:
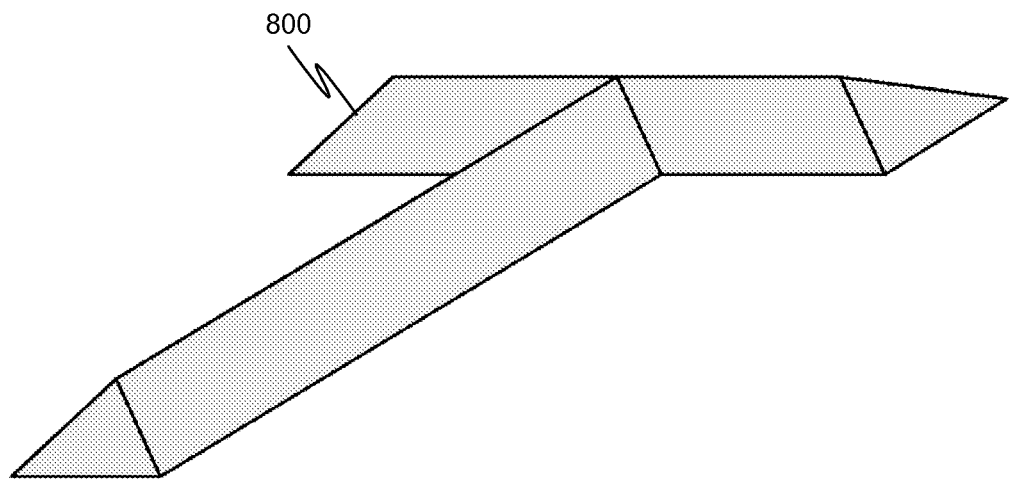
FIG. 8A is an example, in accordance with an example embodiment, of a three-dimensional polygonal shell constructed from a two-dimensional path.
Figure 8B:
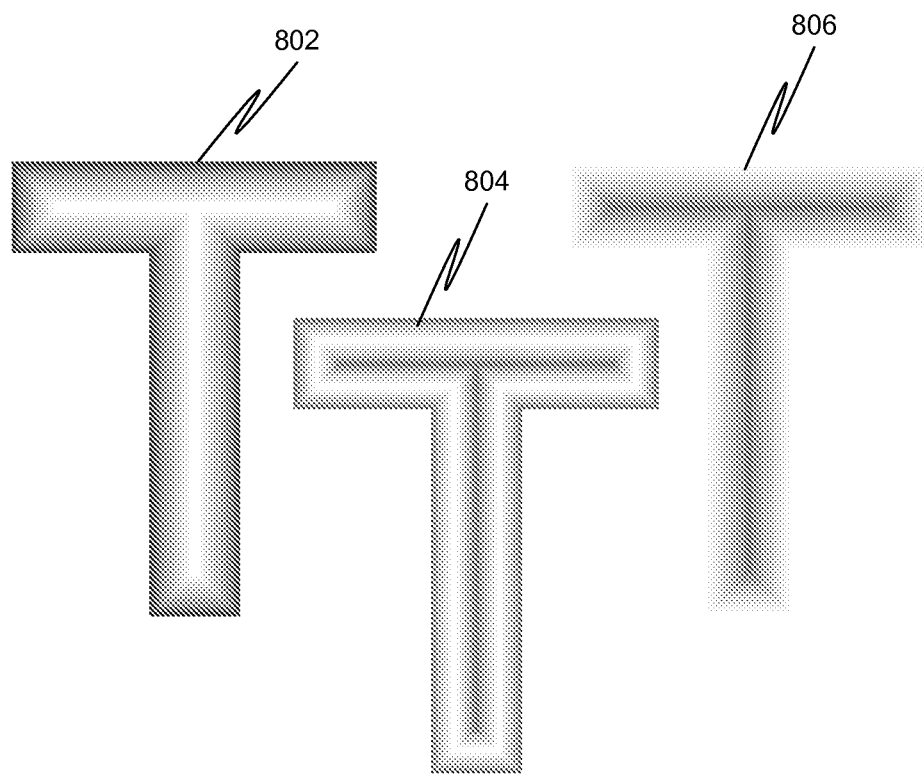
FIG. 8B shows several examples, in accordance with an example embodiment, of different results obtainable by varying the mapping.

FIGS. 8A-8B are additional example shapes in accordance with an example embodiment. FIG. 8A depicts a three-dimensional bevel 800 of a "T" shape. Once this three-dimensional bevel 800 is projected onto the XY axis and a contour is applied to it, the result may be one of the contoured shapes 802A, 802B, 802C in FIG. 8B.

As described above, gradients can be based on any number of items, such as opacity and color. A color in a graphics application is typically represented by one or more color components. For example, in an RGB color space, all colors are represented by a combination of the color components Red, Green and Blue, and in a CMYK color space, the corresponding colors are instead represented by a combination of the color components Cyan, Magenta, Yellow and a Key color (e.g., Black). The amount of each color component is determined by a color component value. Conventionally, a color change between two colors in a gradient is generated by interpolating each of the color components between the color component values in the first color and the color component values in the second color.

In the proposed gradient, one attribute in the set of attributes may be a color function represented by a mathematical function (linear or non-linear) that specifies a transition for one or more color components between a point on the gradient to which the mathematical function is associated and an adjacent point. For example, in one example embodiment, the colors in a section of a gradient between any two points can be made to vary based on a governing equation. If a first point, located at x=0, on the gradient has an associated color component value C(0)=C0 and a second point on the gradient, located at x=1, has an associated color component value C(1)=C1, then the color of the section of the gradient between the first and second points can be made to vary in accordance with a function f(x), where f(0)=0 and f(1)=1. The color component value, C(x), at any given position along the gradient between the first and second points can be described as C(x)=C0+f(x)(C1−C0). Since f(x) can be virtually any function that fulfills the above constraints, a great variety of color transitions can be obtained for the color component, such as linear transitions, quadratic transitions, logarithmic transitions and sinusoidal transitions (for which multiple cycles of colors optionally can be generated depending on the range of angles used in the calculations).

A different portion of the gradient, for example, between the second point having a color component value C1 and a third point having a color component value C2 may have a different associated function, g(x), such that the color component value at any given point between the second point and the third point can be given by $C(x)=C1+g(x)(C2-C1)$.

The same function can be applied to each of the color components in the gradient to achieve a uniform color change across the gradient for all the color components. Alternatively, one or more color components may have different associated functions to achieve further variation along the color gradient, for example, so that the red component in an RGB color representation has a sinusoidal variation, the green component has a linear variation, and the blue component has a logarithmic variation.

In the color functions described above, the color transition along any section of the gradient, no matter whether the gradient is linear or radial, is dependent on one variable only. In the case of a linear gradient, this variable is measured in the propagation direction of the gradient. Consequently, the color of the gradient is determined by parallel lines of constant color perpendicular to the gradient.

If, however, the functions determining the color of the different gradient sections are made to depend on more than one variable, a contouring attribute can be created. The linear gradient is no longer limited to parallel lines of constant color, but can have a color variation perpendicular to the propagation direction of the gradient. Furthermore, by applying different functions to different sections of the gradient, the color variation perpendicular to the propagation direction of the gradient can be varied between the different sections of the gradient. Instead of having lines of constant color perpendicular to the color gradient propagation direction, the lines of constant color can, for example, become slanting lines or virtually any type of curves that span across the gradient. The linear gradient can then instead be more accurately described as a two-dimensional color gradient represented in a Cartesian coordinate system. A gradient is typically defined in a gradient bounding box, which is mapped to the region of the screen to which the gradient is to be applied, such as a region that includes a single object or a collection of objects, when the gradient has been created. A bounding box can also be used in one implementation of the inventive subject matter to define a two-dimensional gradient. The contouring attribute is defined by a two-dimensional function and can be expressed as $C(x,y)=C0+f(x,y)(C1-C0)$ with C0 and C1 defined in a similar way as the color functions above, and where x and y can be measured in a local coordinate system for the bounding box in which the gradient is generated.

In order to provide a user-friendly way of specifying lines of constant color, the application can receive a user input of a contour line made by a conventional graphics input tool, such as a computer mouse. In one example implementation, the contour line is represented by a Bezier curve, which can be transformed into a function to be used in the expressions above. Different Bezier functions can be defined for different parts of the curve, so that a rainbow contour can be generated for one section of the gradient while a wavy contour is generated for another section of the color gradient, for example.

Figure 9:
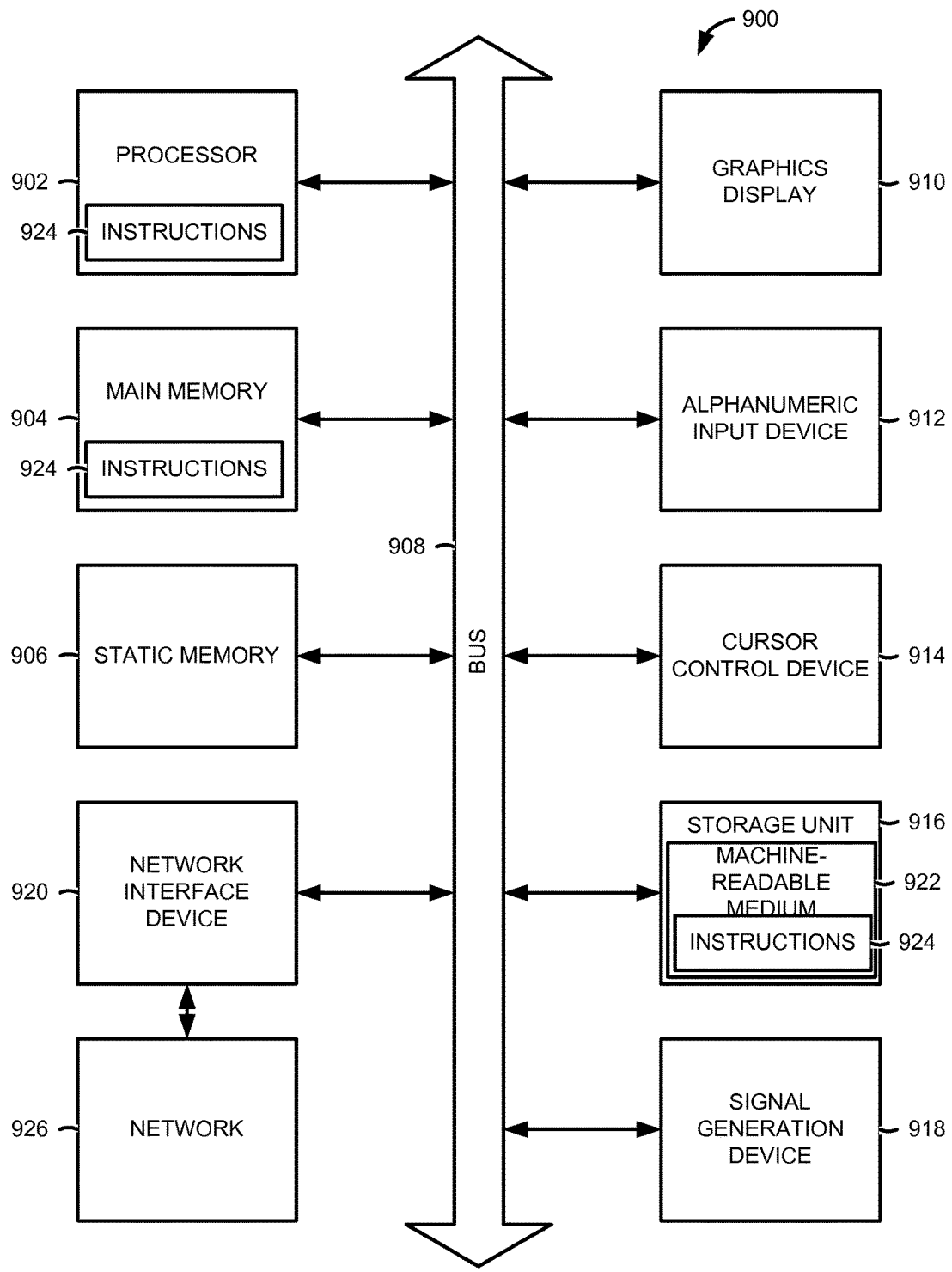
FIG. 9 is a block diagram of a computer processing system at a server system, within which a set of instructions may be executed for causing the computer to perform any one or more of the methodologies discussed herein.

FIG. 9 is a block diagram of a computer processing system 900 at a server system, within which a set of instructions 924 may be executed for causing the computer to perform any one or more of the methodologies discussed herein.

Embodiments may also, for example, be deployed by Software-as-a-Service (SaaS), application service provider (ASP), or utility computing providers, in addition to being sold or licensed via traditional channels. The computer may be a server computer, a PC, a tablet PC, a set-top box (STB), a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 900 includes processor 902 (e.g., a central processing unit (CPU), a GPU or both), main memory 904, and static memory 906, which communicate with each other via bus 908. The processing system 900 may further include graphics display unit 910 (e.g., a plasma display, a liquid crystal display (LCD) or a cathode ray tube (CRT)). The processing system 900 also includes alphanumeric input device 912 (e.g., a keyboard), a cursor control device 914 (e.g., a mouse, touch screen, or the like), a storage unit 916, a signal generation device 918 (e.g., a speaker), and a network interface device 920.

The storage unit 916 includes machine-readable medium 922 on which is stored one or more sets of instructions 924 and data structures (e.g., software) embodying or utilized by any one or more of the methodologies or functions described herein. The instructions 924 may also reside, completely or at least partially, within the main memory 904 and/or within the processor 902 during execution thereof by the processing system 900, the main memory 904 and the processor 902 also constituting machine-readable, tangible media.

The instructions 924 may further be transmitted or received over network 926 via a network interface device 920 utilizing any one of a number of well-known transfer protocols (e.g., HTTP).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions 924. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media. The term "machine-readable" medium, however, shall not be interpreted to cover transitory signals.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

What is claimed is:

1. A method for displaying a two-dimensional (2D) model of a 2D path that defines a plurality of 2D points, the method comprising:
   constructing a three-dimensional (3D) model based on a projection of the 2D path into a third-dimension, wherein the 3D model includes a plurality of 3D points that each corresponds to one of the plurality of 2D points and a variance of third-dimension values of the plurality of 3D points that is based on a third-dimension variance of the projection of the 2D path;
   constructing the 2D model based on the 3D model, wherein the 2D model associates the third-dimension value of each of the plurality of 3D points with the corresponding 2D point of the plurality of 2D points;
   determining a range of the third-dimension values;
   determining a visual attribute value for each of the plurality of 2D points based on the associated third-dimension value and a mapping function that is based on each of the range and the variance of third-dimension values; and
   causing to display the 2D model, wherein a visual attribute for each of the plurality of 2D points is based on the determined visual attribute value.

2. The method of claim 1, wherein the 3D model is a 3D polygonal shell model.

3. The method of claim 2, wherein constructing the 2D model includes:
   projecting the 3D model into two dimensions;
   saving the third-dimension value of each of the plurality of 3D points in a data structure; and
   removing the third-dimension value of each of the plurality of 3D points.

4. The method of claim 1, wherein constructing the 3D model includes determining the third-dimension value for each of the plurality of 3D points based on a first-dimension value and a second-dimension value of the corresponding 2D point of the plurality of 2D points.

5. The method of claim 1, wherein the mapping function is a linear function of the third-dimension values.

6. The method of claim 1, wherein the visual attribute includes at least one of opacity, color, or brightness.

7. The method of claim 1, further comprising:
   updating the 3D model based on a skew operation in a first or a second dimension of the 3D model; and
   constructing the 2D model based on the updated 3D model.

8. A system for displaying a two-dimensional (2D) model of a 2D path that defines a plurality of 2D points, comprising:
   a display device;
   a processor device; and
   a memory device having instructions stored thereon, that when executed by the processor device, perform operations comprising:
   receiving the 2D path;
   constructing a three-dimensional (3D) model based on a projection of the 2D path into a third-dimension, wherein the 3D model includes a plurality of 3D points that each corresponds to one of the plurality of 2D points and a variance of third-dimension values of the plurality of 3D points that is based on a third-dimension variance of the projection of the 2D path;
   constructing the 2D model based on the 3D model, wherein the 2D model associates the third-dimension value of each of the plurality of 3D points with the corresponding 2D point of the plurality of 2D points;
   determining a visual attribute value for each of the plurality of 2D points based on the associated third-dimension value and a mapping function that is based on a range of third-dimension values that includes a minimum value and a maximum value that are based on a variance of third-dimension values of the plurality of 3D points; and
   employing the display device to display the 2D model, wherein a visual attribute for each of the plurality of 2D points is based on the determined visual attribute value.

9. The system of claim 8, wherein constructing the 3D model includes generating a bevel for the path based on a bevel angle.

10. The system of claim 8, wherein constructing the 3D model includes generating a bevel for the path based on a bevel-profile that includes at least one of a portion of a circle or a portion of a cylinder.

11. The system of claim 8, wherein the operations further comprising:
   truncating the third-dimension value for each of the plurality of 3D points based on a height threshold; and
   constructing the 2D model further based on the truncated third-dimension values.

12. The system of claim 8, wherein constructing the 3D model includes wrapping the 2D path around a half-cylinder.

13. The system of claim 8, wherein the mapping function is a non-linear function of the third-dimension values.

14. The system of claim 8, wherein the operations further comprising:
   saving each of the plurality of 2D points in a first data structure; and
   saving each of associated the third-dimension values of each of the plurality of 3D points in a second data structure.

15. A non-transitory computer-readable storage medium having instructions stored thereon for generating a visual attribute for a two-dimensional (2D) path that defines a plurality of 2D points, which, when executed by a processor of a computing device cause the computing device to perform actions comprising:
   constructing a three-dimensional (3D) model based on a projection of the (2D) path into a third-dimension, wherein the 3D model includes a plurality of 3D points that each corresponds to one of the plurality of 2D points and a variance of third-dimension values of the plurality of 3D points that is based on a third-dimension variance of the projection of the 2D path;
   projecting the 3D model into two other dimensions such that the third-dimension value for each of the plurality 3D points is associated with the corresponding 2D point of the plurality of 2D points;

generating a map from the associated third-dimension values to the visual attribute based on a mapping function that is based on the third-dimension variance of the projection of the 2D path; and assigning a visual attribute value to each of the plurality of 2D points based the map.

16. The computer-readable storage medium of claim 15, the actions further comprising:

identifying a minimum value for the third-dimension values;

identifying a maximum value for the third-dimension values; and determining a range of the third-dimension values based on a difference between the maximum value and the minimum value; and generating the mapping function based on the range of the third-dimension values.

17. The computer-readable storage medium of claim 15, the actions further comprising:

displaying each of the plurality of 2D points, wherein the visual attribute for each of the plurality of 2D points is based on the assigned visual attribute value.

18. The computer-readable storage medium of claim 15, wherein the visual attribute includes at least one of opacity, color, or brightness.

19. The computer-readable storage medium of claim 15, the actions further comprising:

saving the third-dimension value of each of the plurality of 3D points in a data structure; and removing the third-dimension value of each of the plurality of 3D points.

20. The computer-readable storage medium of claim 15, the actions further comprising:

skewing the 3D model based on a skew operation in a first dimension or a second dimension; and projecting the skewed 3D model into the two dimensions.

* * * * *